(12) United States Patent
Kazemeyni

(10) Patent No.: US 11,785,034 B2
(45) Date of Patent: *Oct. 10, 2023

(54) DETECTING SECURITY RISKS BASED ON OPEN PORTS

(71) Applicant: Rapid7, Inc., Boston, MA (US)

(72) Inventor: Fatemeh Kazemeyni, Toronto (CA)

(73) Assignee: Rapid7, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/590,952

(22) Filed: Feb. 2, 2022

(65) Prior Publication Data

US 2022/0159026 A1 May 19, 2022

Related U.S. Application Data

(63) Continuation of application No. 16/569,759, filed on Sep. 13, 2019, now Pat. No. 11,277,426.

(51) Int. Cl.
*H04L 9/40* (2022.01)

(52) U.S. Cl.
CPC ...... *H04L 63/1425* (2013.01); *H04L 63/1416* (2013.01); *H04L 63/1433* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 8,516,573 B1* | 8/2013 | Brown | ............... | H04L 63/1416 709/225 |
| 8,990,944 B1* | 3/2015 | Singh | ............... | G06F 21/53 726/24 |
| 9,251,345 B2* | 2/2016 | Freeman | ............... | G06F 21/566 |
| 2012/0084862 A1* | 4/2012 | Freeman | ............... | G06F 21/56 726/23 |
| 2020/0059480 A1* | 2/2020 | Junod | ............... | H04L 63/1425 |
| 2020/0322363 A1* | 10/2020 | Huang | ............... | H04L 43/16 |

* cited by examiner

*Primary Examiner* — Joseph P Hirl
*Assistant Examiner* — Hassan Saadoun
(74) *Attorney, Agent, or Firm* — Ashwin Anand

(57) ABSTRACT

Disclosed herein are methods, systems, and processes to detect anomalous computing assets based on open ports. Security data associated with computing assets executing in a computing environment is received from an agent executing on the computing assets. Open port information associated with the computing assets is extracted from the security data. The open port information and a list of computing assets with the open port information is used to generate a type similarity model and an open port model. The type similarity model clusters the computing assets and the open port model determines whether a port associated with a computing asset with the open port information is likely to be open or should be open in the computing environment, permitting detection of anomalous computing assets in the computing environment.

20 Claims, 9 Drawing Sheets

DETECTING SECURITY RISKS BASED ON OPEN PORTS

CROSS-REFERENCE TO RELATED APPLICATIONS

This application is a continuation of U.S. patent application Ser. No. 16/569,759, filed Sep. 13, 2019, which is hereby incorporated by reference in its entirety.

BACKGROUND

Field of the Disclosure

This disclosure is related to cybersecurity computing systems. In particular, this disclosure is related to detecting anomalous computing assets based on open ports.

Description of the Related Art

Vulnerability management is a recurring process of identifying, classifying, prioritizing, remediating, and/or mitigating software vulnerabilities in complex networked computing environments. Vulnerabilities can be discovered with a vulnerability scanner which analyzes a computing system by searching for known vulnerabilities (e.g., open ports, insecure software configurations, susceptibility to malware infections, and the like). Remediating vulnerabilities involves patch installation, network security policy changes, software reconfiguration, and the like.

Existing vulnerability management systems rely on public sources (e.g., the National Vulnerability Database (NVD)) or commercial vulnerability alerting services. A Common Vulnerabilities and Exposures (CVE) is a list of entries, each containing an identification number, a description, and at least one public reference that aims to provide common names for publicly known problems. The goal of CVE is to make it easier to share data across tools, repositories, and services with a common enumeration. CVE entries are used in both public sources like the NVD as well as numerous other cybersecurity products and services.

Therefore, existing vulnerability management systems rely on a set of CVEs or predefined checks to determine how vulnerable a computing asset is. Unfortunately, while such predefined checks can be valuable in certain scenarios, tracking and identifying vulnerabilities in this piece meal manner is cumbersome and inefficient, in addition to being unfeasible in certain computing environments. An improved technology-related solution for anomaly detection that does not solely rely on CVEs and other such rule-based or pre-defined checks is required.

SUMMARY OF THE DISCLOSURE

Disclosed herein are methods, systems, and processes for anomalous asset detection based on open ports. One such method involves receiving security data associated with computing assets executing in a computing environment from an agent executing on the computing assets, extracting open port information associated with the computing assets from the security data, providing the open port information and a list of the computing assets associated with the open port information to a processor executing instructions stored on a memory to generate: (1) a type similarity model and (2) an open port model, receiving from the type similarity model clusters of computing assets and from the open port model information indicating whether each port associated with the computing assets with the open port information is likely to be open or should be open in the computing environment, and detecting anomalous computing assets in the computing environment.

In one embodiment, the method involves transmitting to the agent executing on the anomalous computing asset instructions to close their respective open ports in response to the vulnerability scanner detecting the anomalous computing assets. In another embodiment, the clusters of computing assets are generated by the type similarity model by clustering the computing assets using k-means clustering based on a type similarity characteristic of the computing assets, and the type similarity characteristic includes a role type, a use case type, a job type, a team type, a group type, and/or a department type.

In some embodiments, extracting the open port information from the security data is based on parsing the security data based on port type and the information indicating whether the port associated with the computing assets with the open port information is likely to be open or should be open is generated by the open port model based on a historical frequency of ports of the computing assets with the open port information being open.

In other embodiments, the vulnerability scanner detects the anomalous computing assets in the computing environment based on the open port model indicating that a port associated with a computing asset with the open port information should not be open or is not likely to be open compared to other computing assets in the same cluster of the clusters generated by the type similarity model as the computing asset.

In certain embodiments, the method involves receiving security data associated with computing assets in a computing environment from an agent executing on the computing assets in the computing environment, generating port information associated with the computing assets from the security data, clustering the computing assets based on a type similarity characteristic of the computing assets, determining a likelihood metric that indicates whether each port associated with the computing assets identified by generating the port information is open based on a historical frequency of the ports being open in the computing environment, and identifying anomalous computing assets in the computing assets based on the anomalous computing assets each having at least one open port based on the likelihood metric associated with the open port indicating that the open port is open and is part of a cluster of computing assets that share the type similarity characteristic.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

This disclosure may be better understood, and its objects, features, and advantages made apparent to those skilled in the art by referencing these drawings and/or figures.

Figure 1:
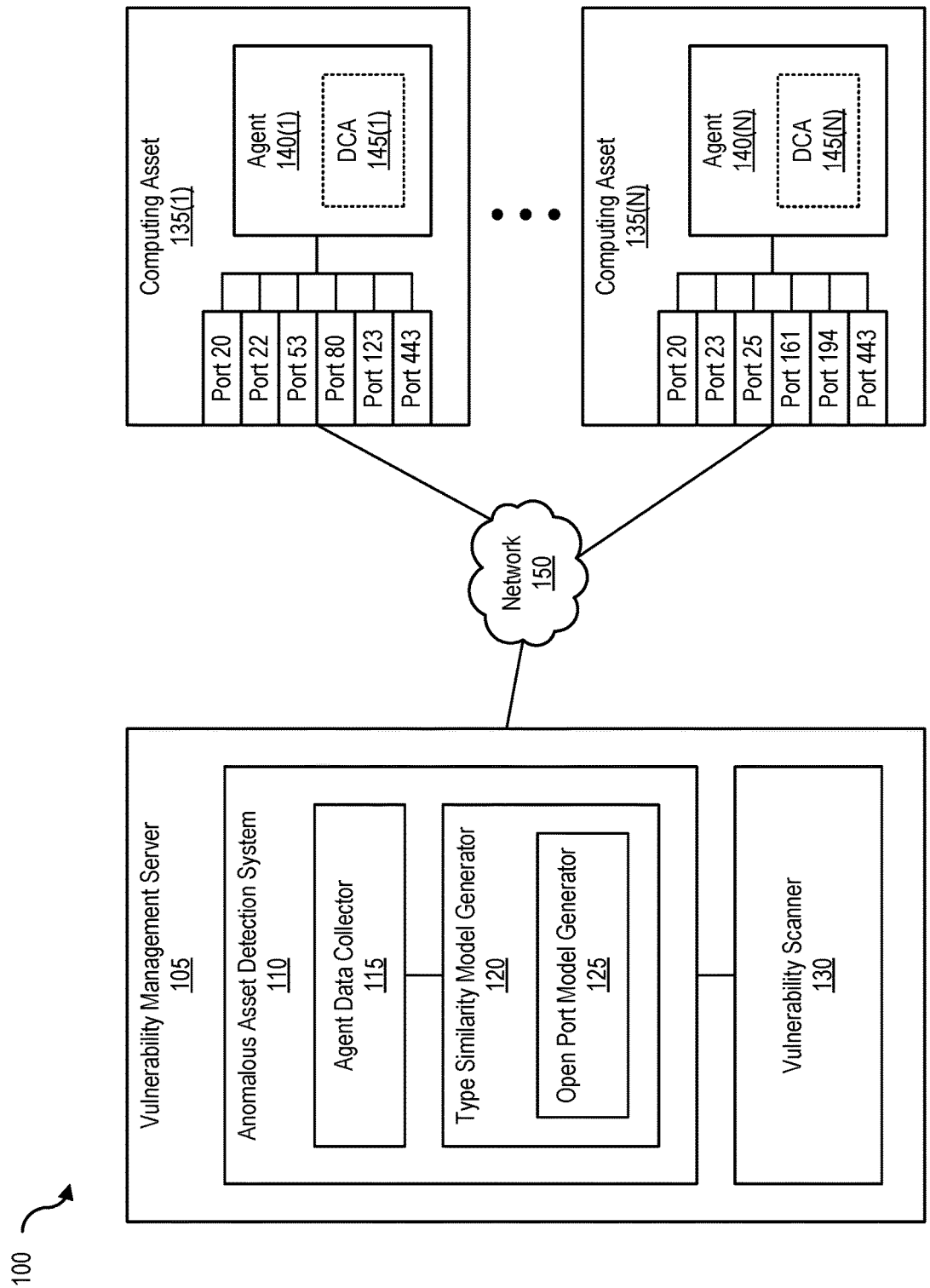
FIG. 1 is a block diagram 100 of a vulnerability management server, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Existing vulnerability management systems rely on (and are constrained by) a set of Common Vulnerabilities and Exposures (CVEs) or predefined checks to determine how vulnerable a particular computing asset is in a given computing environment. As noted, while such predefined checks are valuable to some extent (e.g., in identifying known vulnerabilities), tracking vulnerabilities using systems and methods that are characterized by such unsystematic partial measures taken over time is suboptimal.

In addition, identifying whether a given computing asset is anomalous by checking each known vulnerability is a complex task and not feasible in complex computing environments with hundreds if not thousands of networked computing assets. What's more, relying solely on CVEs limits anomaly detection to known vulnerabilities and does not permit security risk detection independent of predefined vulnerabilities signatures.

Given their role as communication endpoints, open ports can be sources of vulnerabilities in computing systems. Physical as well as wireless connections are terminated at ports of hardware devices. At the software level (e.g., within an operating system), a port is a logical construct that identifies a specific process or a type of network services. Ports are identified for each protocol and address combination by 16-bit unsigned numbers (called the port number).

Common protocols that use port numbers are Transmission Control Protocol (TCP) and User Datagram Protocol (UDP).

A port number is associated with an Internet Protocol (IP) address of a host and the protocol type of the communication. The port number completes the destination or origination network address of a message. Specific port numbers are commonly reserved to identify specific services to enable an arriving package to be easily forwarded to a running application (e.g., well-known port numbers and ephemeral ports). When used as a service enumeration, ports provide a multiplexing service for multiple services or multiple communication sessions at one network address. In the client-server model of application architecture, multiple simultaneous communication sessions can be initiated for the same service.

Open ports are doorways to a secure perimeter of a computing environment. Behind open ports, application and services listen for inbound packets and wait for external connections. In existing cybersecurity systems, firewall systems can control which ports are opened or closed on Internet-facing servers. Typically, ports are open (and kept open) only on a 'need-to-be' basis, constrained and limited by the Internet communication needs of applications and services that execute on the (protected) servers.

In normal operating scenarios, network administrators only open required ports (e.g., port 80 for a web server) as well as ports for adjacent asks (e.g., for remote administration). However, many servers are shipped (e.g., by default) with a number of services that may not be needed but a firewall may be configured to permit traffic on ports used by these services. Because maintaining a highly restrictive security configuration is an administrative overhead, in a significant number of cases, along with ports which need to be open also exist ports that 'might be needed.' In addition, applications and services being installed may modify firewall configuration to permit traffic on ports these applications and services plan to use. Therefore, firewall configuration can change when an application is being installed (e.g., based on the installer).

Unfortunately, network administrators are not typically aware of open ports (e.g., at a given time) and do not usually notice the automatic configuration of firewall exceptions by applications or services. Therefore, the security risk associated with open ports is difficult to assess and even more difficult to mitigate. For example, malicious attackers (e.g., hackers, and the like) typically execute port scanning of a target server. The results of port scanning provide malicious attackers with information on open ports as well as applications and services associated with these open ports. This information can be used to then orchestrate a much larger attack.

Open ports can be exploited in order to compromise the security of Internet-facing services and can be used to eventually penetrate the security perimeter as well. For example, malicious attackers can use open port information to spread malware infections through open ports, exploit vulnerabilities in services and applications running on open ports, exploit unsafe configurations in services and applications running on open ports, and cause downtime of critical business applications by running Denial of Service (DoS) attacks on open ports (e.g., open ports belonging to less robust services).

Malware utilizes network communications for a variety of purposes (e.g., malware distribution, calling home, taking commands as part of remote control activities, and the like). The security community has identified a list of ports commonly used by malware for such activities (e.g., Trojan ports) and network administrators are vigilant for such ports being open as their open status may indicate a malware infection. Unfortunately, certain malware uses common ports that are also used by critical business applications (e.g., web servers). In such cases, it is challenging to determine which entity is using the open port without further investigation. Consequently, security risks introduced by open ports can be easily overlooked.

What's more, open ports are frequently used by applications and services and like any piece of code, open ports may include vulnerabilities or bugs. The greater the number of applications and services that are executing using open ports for network communications, the higher the security risk is that one or more these open ports may include a vulnerability that can be exploited. For example, a bug in a given service reachable from the outside may cause the service to crash. Such a crash may lead to execution of arbitrary code on the affected machine. Exploiting application vulnerabilities may then give the attacker access to application data or user data as well as the opportunity to install malware.

In addition, certain services or applications executing on open ports may have poorly configured default settings or running policies. Such applications may be the target of dictionary attacks (e.g., attacks can identify credentials used by legitimate users because of poorly configured password policies). Attackers can then use the stolen credentials to log into applications, exfiltrate data, cause downtime, take control of the affected machine, and the like.

For example, Microsoft's Structured Query Language (SQL) server may be the victim of dictionary attacks or SQL injection. When exploited, either of these vulnerabilities may give the attacker access to not only the data on SQL server, but also to the entire system because of features of SQL server that enable system access (e.g., calling dynamic-link libraries (DLLs) outside of the database via extended stored procedures, and the like). Therefore, it is not surprising that the default port used by Microsoft SQL Server is one of the most probed ports on the Internet (in addition to Network Basic Input/Output System (NetBIOS) and the Hypertext Transfer Protocol (HTTP) default port).

Furthermore, open ports may be target of DoS attacks. While some applications and services may have built-in protection mechanisms to withstand DoS attacks to a certain extent (e.g., web servers or database servers), others may not have such defensive mechanisms in place causing the entire server to go down (e.g., if introduced to sufficient stress). Therefore, having a robust implementation of a web server with proper discard mechanisms for suspicious requests may not be enough, if for example, one is running on the same server, a Network Time Protocol (NTP) service that crashes when certain stress is applied in terms of time synchronization operations that take place concurrently. In this example, the crash of the unused NTP service can cause system instability and can bring down an entire server. Therefore, an attacker can perform successful DoS attacks on a web server, without even targeting port 80.

Finally, open ports raise security concerns beyond commonly known Trojans. For example, while a firewall permits enforcement of secure port usage policies, the firewall does not inform a network administrator whether a given port is safe or unsafe and cannot establish whether an open port is even needed (e.g., because a firewall has no visibility (e.g., beyond a service or application identifier) into what services and applications use open ports, their up to date state, whether they are vulnerable to attacks, and the like). Unfortunately, manual monitoring of active connections and manual filtering of their state is cumbersome, time-consuming, and can be counter-productive (e.g., telling the good from the bad), and one cannot rely on firewalls for securing Internet-facing servers in modern cybersecurity computing environments.

As previously noted, given their role as communication endpoints, open ports can be sources of vulnerabilities in computing systems. To deal with security risks posed by such vulnerabilities, modern organizations and companies typically implement vulnerability management as part of their cybersecurity operations. Vulnerability management is a recurring process of identifying, classifying, prioritizing, remediating, and/or mitigating software vulnerabilities in complex networked computing environments. Vulnerabilities can be discovered with a vulnerability scanner which analyzes a computing system by searching for known vulnerabilities (e.g., open ports, insecure software configurations, susceptibility to malware infections, and the like). Remediating vulnerabilities involves patch installation, network security policy changes, software reconfiguration, and the like.

Unfortunately, existing vulnerability management systems rely on public sources (e.g., the National Vulnerability Database (NVD)) or commercial vulnerability alerting services. A Common Vulnerabilities and Exposures (CVE) is a list of entries, each containing an identification number, a description, and at least one public reference that aims to provide common names for publicly known problems. The goal of CVE is to make it easier to share data across tools, repositories, and services with a common enumeration. CVE entries are used in both public sources like the NVD as well as numerous other cybersecurity products and services.

Therefore, existing vulnerability management systems rely on a set of CVEs or predefined checks to determine how vulnerable a computing asset is. Unfortunately, while such predefined checks can be valuable in certain scenarios, tracking and identifying vulnerabilities in this piece meal manner is cumbersome and inefficient, in addition to being unfeasible in certain computing environments. Disclosed herein is an improved technology-related solution for anomaly detection that does not rely on CVEs and other such predefined checks.

Example Vulnerability Management Server for Port Security

FIG. 1 is a block diagram 100 of a vulnerability management server 105, according to one embodiment. Vulnerability management server 105 can be any type of physical or virtual computing device (e.g., a physical machine with a processor and a memory) and includes at least an anomalous asset detection system 110 (e.g., to detect anomalous (computing) assets based on open ports) and a vulnerability scanner 130. Anomalous asset detection system 110 includes at least an agent data collector 115 and a type similarity model generator 120 which further includes an open port model generator 125.

Vulnerability management server 105 is communicatively coupled to computing assets 135(1)-(N) (which can each be any type of physical or virtual computing device) via a network 150 (which can be any type of network or interconnection). Computing assets 135(1)-(N) each include at least an agent (e.g., agents 140(1)-(N), respectively), each with a data collector and analyzer (e.g., DCAs 145(1)-(N) in agents 140(1)-(N), respectively). Computing assets 135(1)-(N) each include one or more ports (e.g., ports 20, 22, 53, 80, 123, and 443 in computing asset 135(1) and ports 20, 23, 25, 161, 194, and 443 in computing asset 135(N)).

In one embodiment, agent data collector 115 receives, via network 150, security data associated with computing assets 135(1)-(N) from agents 140(1)-(N) executing on computing assets 135(1)-(N), respectively. Examples of information that can be part of security data can include, but is not limited to, port information (e.g., open ports and closed ports), applications executing on computing assets 135(1)-(N), services executing on computing assets 135(1)-(N), ports being utilized by applications and services executing on computing assets 135(1)-(N), daemon lists of ports on computing assets 135(1)-(N), banner information, software versions, available open port controls, network stack and programs at open ports, configurations of applications and services executing on open ports, and the like.

In the above example, agent data collector 110 extracts open port information associated with one or more of computing assets 135(1)-(N) from the security data and provides the open port information and a list of computing assets associated with the open port information (e.g., one or more of computing assets 135(1)-(N) that have open ports) to a processor (e.g., a processor of vulnerability management server 105). In one embodiment, the processor then executes instructions stored on a memory (e.g., a memory of vulnerability management server 105) to generate at least (1) a type similarity model (e.g., generated using type similarity model generator 120) and (2) an open port model (e.g., generated using open port model generator 125, which is part of type similarity model generator 120).

In certain embodiments, anomalous asset detection system 110 receives at least (1) one or more clusters of computing assets (e.g., clustered using k-means clustering based on one or more similarity characteristics of computing assets 135(1)-(N) such as role, use case, job, team, group, department, and the like) from the type similarity model and (2) information indicating whether each port associated with one or more of computing assets 135(1)-(N) with the open port information is likely to be open (or should be open) in the computing environment from the open port model. Anomalous asset detection system 110 then detects anomalous computing assets in the computing environment. Vulnerability scanner 130 (or anomalous asset detection system 110) then transmits instruction(s) to an agent executing on an anomalous computing asset (e.g., agent 140(1) executing on computing asset 135(1)) to close one or more (respective) open ports in response to anomalous asset detection system 110 detecting computing asset 135(1) as being anomalous based on open ports.

Example of Generating a Type Similarity Model and an Open Port Model

Figure 2:
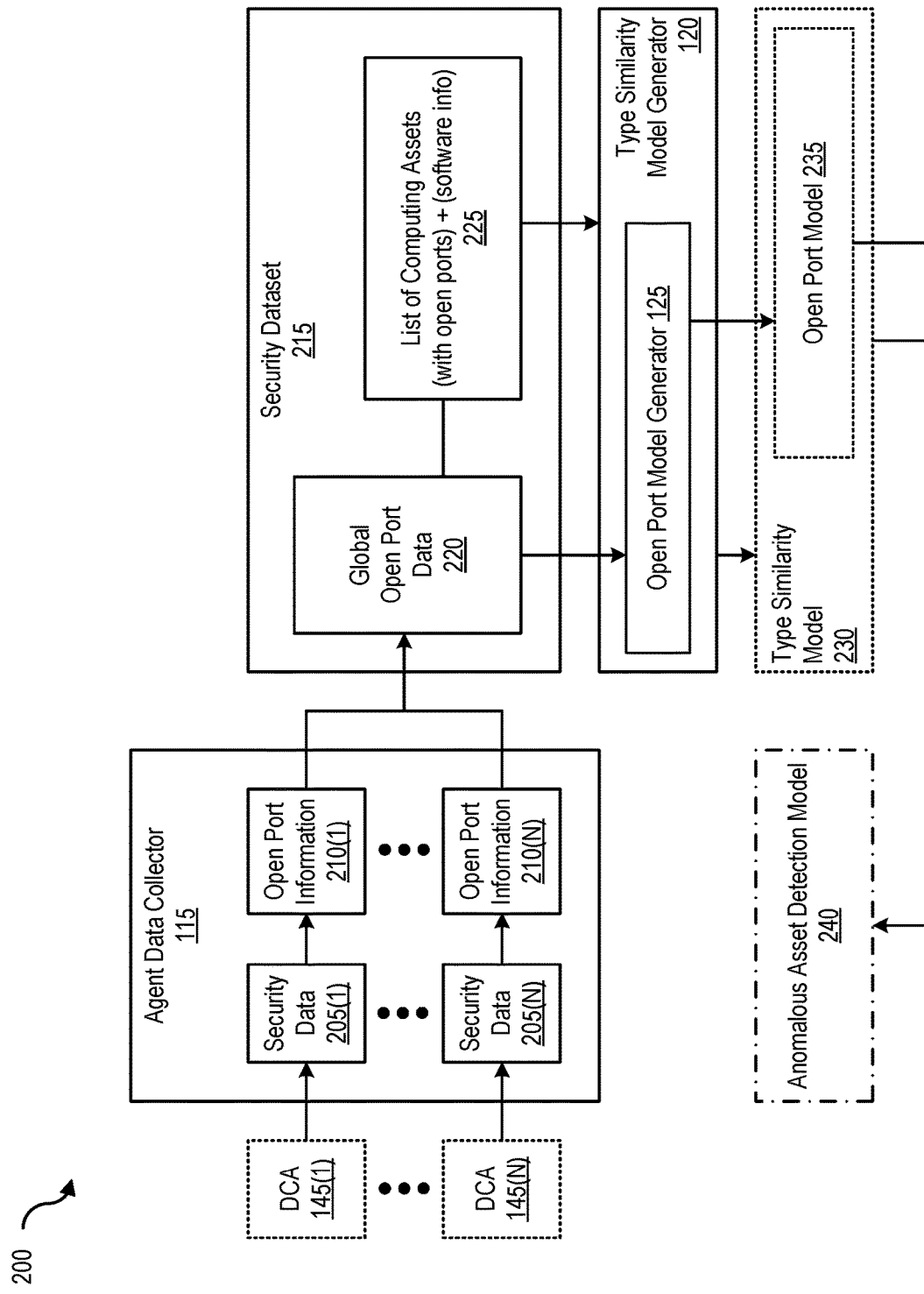
FIG. 2 is a block diagram 200 of a type similarity model generator and an open port model generator, according to one embodiment of the present disclosure.

FIG. 2 is a block diagram 200 of a type similarity model generator and an open port model generator, according to one embodiment. Agent data collector 115 receives security data 205(1)-(N) from DCAs 145(1)-(N). In this example, agent data collector 115 extracts open port information from security data 205(1)-(N) by parsing security data 205(1)-(N) based on port type. Once parsed, anomalous asset detection system 110 generates a security dataset 215 with global open port data 220 and a list of computing assets 225 (e.g., with open ports and associated software information). Anomalous asset detection system 110 then uses type similarity model generator 120 and open port model generator 125 to generate a type similarity model 230 and an open port model 235, respectively, for anomalous asset detection based on open ports.

In certain embodiments, information indicating whether a given port associated with computing assets 135(1)-(N) is likely to be open (or should be open) is generated by open port model 235 based on a historical frequency of ports of computing assets with open port information being open (e.g., as indicated in global open port data 220). In this example, anomalous asset detection system 110 generates an anomalous asset detection model 240 (e.g., a combination of type similarity model 230 and open port model 235) to detect anomalous assets based on open ports. Therefore, agent data collector 115 collects security data 205(1)-(N) from agents 140(1)-(N) and parses the security data to extract open ports (or open port information). In FIG. 2, the parsed security data is shown as security dataset 215 with global open port data 220 and list of computing assets 225 (e.g., with open ports and software information).

In some embodiments, type similarity model 230 that is part of anomalous asset detection model 240 clusters similar computing assets (e.g., using k-means clustering, in addition to other clustering methodologies) to increase the accuracy of computing assets that should be compared to determine whether their ports should be open (e.g., using list of computing assets 225 with indications of the type similarity characteristics of computing assets such as role, use case, job, team, group, department, and the like). Open port model 235 that is also part of anomalous asset detection model 240 determines the likelihood of each port being open (e.g., based on one or more statistical analysis methods such as regression, and the like, executed on global open port data 220, which includes the historical frequency of ports being open).

Therefore, anomalous asset detection model 240 can detect one or more anomalous computing assets in a given computing environment based on open port model 235 indicating that a port associated with a given computing asset with open port information should not be open or is not likely to be open (e.g., compared to other computing assets in the same cluster of one or more clusters generated by type similarity model 230 as the given computing asset). In this example, anomalous asset detection model 240 can identify the 'most' anomalous computing asset(s) (e.g., one or more computing assets that have (or are likely to have) anomalous open ports (e.g., as determined by open port model 235) compared to their peer computing assets (e.g., as determined by type similarity model 230)).

Example of Detecting Anomalous Computing Assets Based on Open Ports

Figure 3:
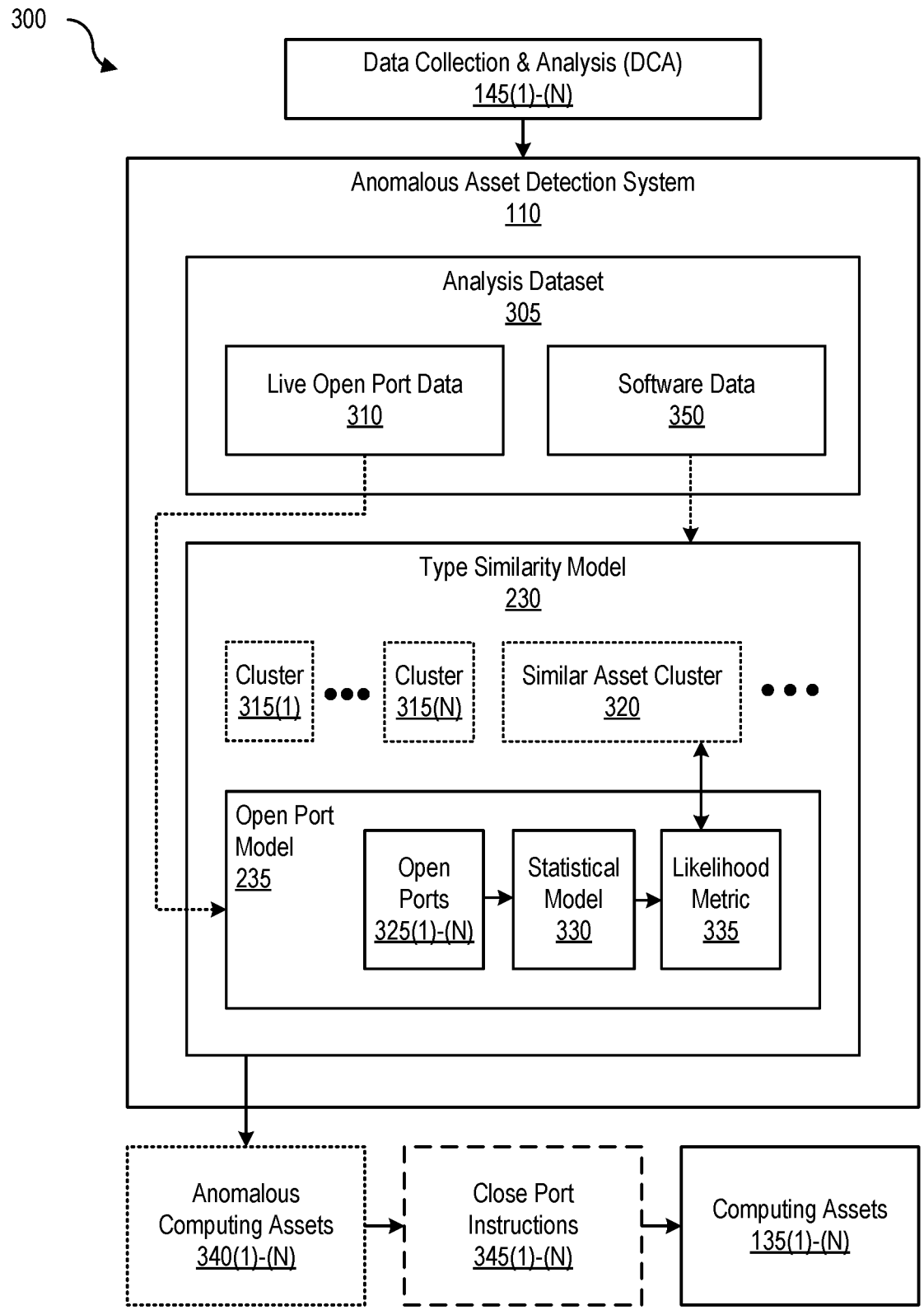
FIG. 3 is a block diagram 300 of an anomalous asset detection system, according to one embodiment of the present disclosure.

FIG. 3 is a block diagram 300 of an anomalous asset detection system, according to one embodiment. Anomalous asset detection system 110 receives security data 205(1)-(N) from DCAs 145(1)-(N) of agents 140(1)-(N) executing on computing assets 135(1)-(N). Agent data collector 115 parses the agent-collected security data to extract live open port data 310 (in addition to associated software data 350 indicated installed software on one or more computing assets which have one or more open ports). As shown in FIG. 2, live open port data 310 and software data 350 (e.g., installed software data) is part of analysis dataset 305 (e.g., to be processed by type similarity model 230 and open port model 235).

Type similarity model 230 clusters one or more computing assets with one or more open ports into one or more clusters 315(1)-(N) based on a type similarity characteristic (e.g., based on a role type, a use case type, a job type, a team type, a group type, a department type, and the like). As noted, one or more of various clustering methodologies (e.g., clustering algorithms such as k-means, mean-shift, Density-Based Spatial Clustering of Applications with Noise (DBSCAN), Expectation-Maximization (EM) using Gaussian Mixture Models (GMM), agglomerative hierarchical, and the like) can be used by type similarity model 230 to cluster computing assets with open ports based on a type of the computing asset (e.g., to increase the accuracy of comparing computing assets with open ports for anomalous open ports). As shown in FIG. 3, type similarity model 230 generates a similar asset cluster 320 based on the type similarity characteristic(s) of computing assets (e.g., as indicated by (installed) software data 350).

Open port model 235 then uses live open port data 310 to identify the likelihood of each port being open (e.g., open ports 325(1)-(N)) based on statistical model 330 and likelihood metric 335. In this example, likelihood metric 335 is correlated with similar asset cluster 320 to determine the 'most' anomalous assets—e.g., computing assets which have anomalous open ports compared to their peer computing assets in similar asset cluster 320 (e.g., anomalous computing assets 340(1)-(N) as shown in FIG. 3). In certain embodiments, anomalous asset detection system 110 then transmits close port instructions 345(1)-(N) for anomalous computing assets 340(1)-(N) to computing assets 135(1)-(N).

In one embodiment, anomalous asset detection system 110 detects anomalous computing assets in a computing environment based on open ports of computing assets operating in the computing environment using security data collected by agents executing on the computing assets. In another embodiment, one or more machine learning methods are used to cluster computing assets with similar tasks which have similar open ports (e.g., port 20 that is being used to perform a specific computing task (e.g., application, service, network communication, and the like) by both computing asset 135(1) and computing asset 135(N) as shown in FIG. 1).

In certain embodiments, by determining the likelihood of a port being open inside similar asset cluster 320, the accuracy of anomalous asset detection as a result of comparing each computing asset with only its peer computing assets (e.g., computing assets with a similar task) is vastly improved (e.g., the flagging of a port as anomalous when it is normal for the given port to be open for a specific/special task is avoided—thus saving considerable computing resources compared to traditional rule-based vulnerability management systems).

In some embodiments, a report with anomalous open ports with corresponding computing asset analysis is transmitted to a Security Operations Center (SOC) for manual intervention. In other embodiments, vulnerability scanner 130 can be configured by anomalous asset detection system 110 to cause a computing asset to close open ports, modify its firewall policies, perform re-configuration, and the like. Therefore, by collecting and analyzing information associated with open ports, vulnerability management server 105 can identify anomalous open ports in computing assets. Detecting anomalies in this manner can help an organization identify computing assets which are at risk of malicious attacks.

Example Processes for Anomalous Asset Detection Based on Open Ports

Figure 4:
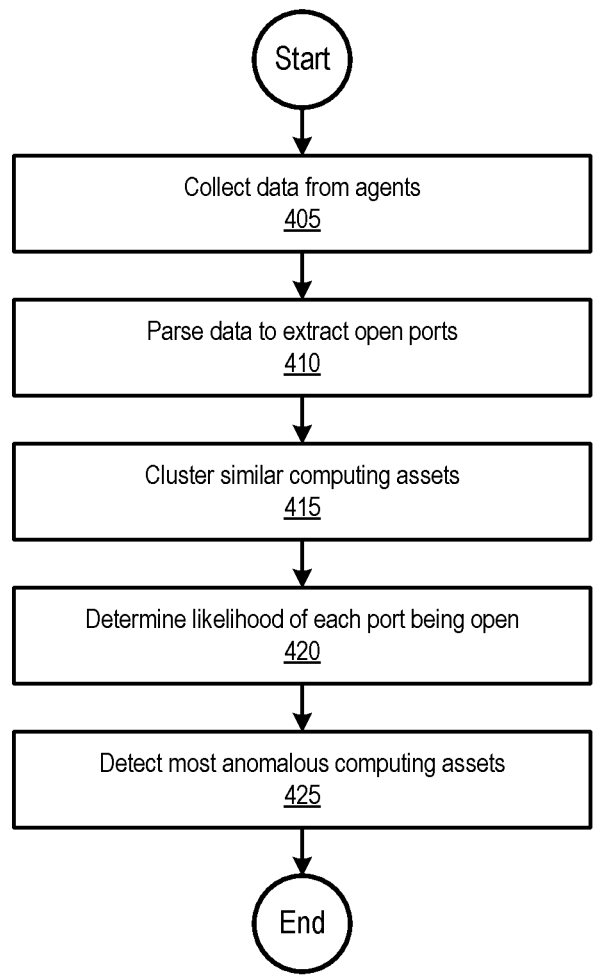
FIG. 4 is a flowchart 400 of a process for detecting anomalous assets based on open ports, according to one embodiment of the present disclosure.

FIG. 4 is a flowchart 400 of a process for detecting anomalous assets based on open ports, according to one embodiment. The process begins at 405 by collecting data from agents (e.g., agent data collector 115 collects DCA 145(1) from agent 140(1) with information about ports 20, 22, 53, 80, 123, and 443 (in addition to other security data) as shown in FIG. 1). At 410, the process parses the (collected) data to extract open ports. For example, security data 205(1) can be parsed to extract open port information 210(1) identifying one or more open ports in computing asset 135(1) (e.g., as shown in FIG. 2).

At 415, the process clusters similar computing assets (e.g., based on the type of the computing asset, the type of software installed on the computing asset, or other type similarity characteristic of the computing asset identified by software data 350). As noted, one or more different types of clustering algorithms can be utilized to cluster similar computing assets (e.g., to generate similar asset cluster 320 as shown in FIG. 3). At 420, the process determines the likelihood of each port being open (e.g., based on historical data identified in live open port data 310). As noted, one or more statistical models (e.g., statistical model 330) can be used to determine the likelihood of each port being open (e.g., likelihood metric 335).

The process ends at 425 by detecting one or more "most" anomalous computing assets (e.g., compared to a peer group of computing assets in similar asset cluster 320). Detecting anomalous computing assets based on open ports in this manner has several advantages. First, utilizing machine learning models to detect anomalies in computing environments based on open ports enables robust vulnerability management without solely relying on cumbersome pre-defined checks and other rule-based methodologies, which run the risk of being outdated. Second, generating a similar asset cluster based on the software type, installed software, and other type-based characteristics of computing assets and combining these clustered results with statistical methods that ascertain whether it is normal or likely for a certain port to be open under one or more scenarios permits a more accurate comparison of computing assets with open ports while accounting for circumstances where the status of a given port being open can also be analyzed from the perspective of anomaly detection. In this manner, open port information can be processed efficiently to perform optimized anomaly detection in vulnerability management systems.

Figure 5:
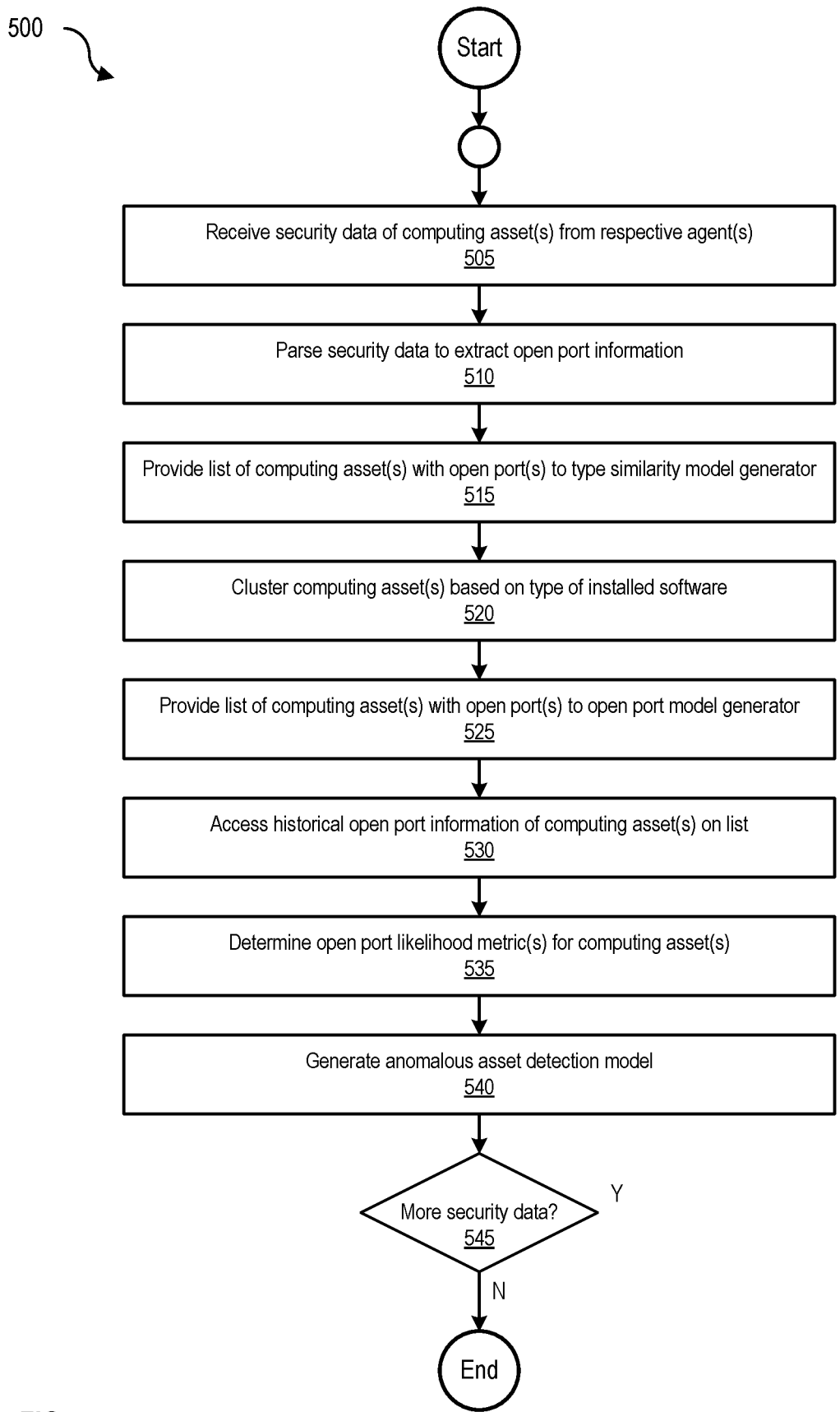
FIG. 5 is a flowchart 500 of a process for generating an anomalous asset detection model, according to one embodiment of the present disclosure.

FIG. 5 is a flowchart 500 of a process for generating an anomalous asset detection model, according to one embodiment. The process begins at 505 by receiving security data of computing asset(s) from respective agent(s) (e.g., security data 205(1)-(N) from DCAs 145(1)-(N)) as shown in FIG. 2). At 510, the process parses the security data to extract open port information (e.g., open port information 210(1)-(N)). At 515, the process provides a list of computing asset(s) with open port(s) to a type similarity model generator (e.g., list of computing assets 225 to type similarity model generator 120 as shown in FIG. 2).

At 520, the process clusters computing asset(s) based on the type of installed software (e.g., to ascertain and compare which applications and/or services are using the given (and identified) open ports). In some embodiments, other types of similarity characteristics can be used for clustering computing assets (e.g., role type, a use case type, a job type, a team type, a group type, or a department type). At 525, the process provides the list of computing asset(s) with open port(s) to open port model generator 125.

At 530, the process accesses historical open port information of computing asset(s) on the list (e.g., global open port data 220 as shown in FIG. 2 or live open port data 310 as shown in FIG. 3), and at 535, determines open port likelihood metric 335 for the computing asset(s) (e.g., the likelihood that a given port on a given computing asset (that is further clustered into a peer group of the given computing asset) is open, likely to be open, or should be open).

At 540, the process generates anomalous asset detection model 240 (e.g., as shown in FIG. 2). As shown in FIGS. 2 and 3, anomalous asset detection model 240 combines type similarity model 230 and open port model 235 to perform anomaly detection based on open ports. The process ends at 545 by determining if there is more security data to process. If there is more security data to process, the process loops to 505. Otherwise, the process ends.

Therefore, computing assets with open ports in a given computing environment are first clustered based on type similarity (e.g., based on installed software indicative of open ports, or other criteria) and then further processed based on statistical methods that determine the likelihood of their ports being open based on historical port data (e.g., the feasibility (or normalcy) of such ports being open). In this manner, anomaly detection based on open ports can be performed to optimize vulnerability management systems.

Figure 6:
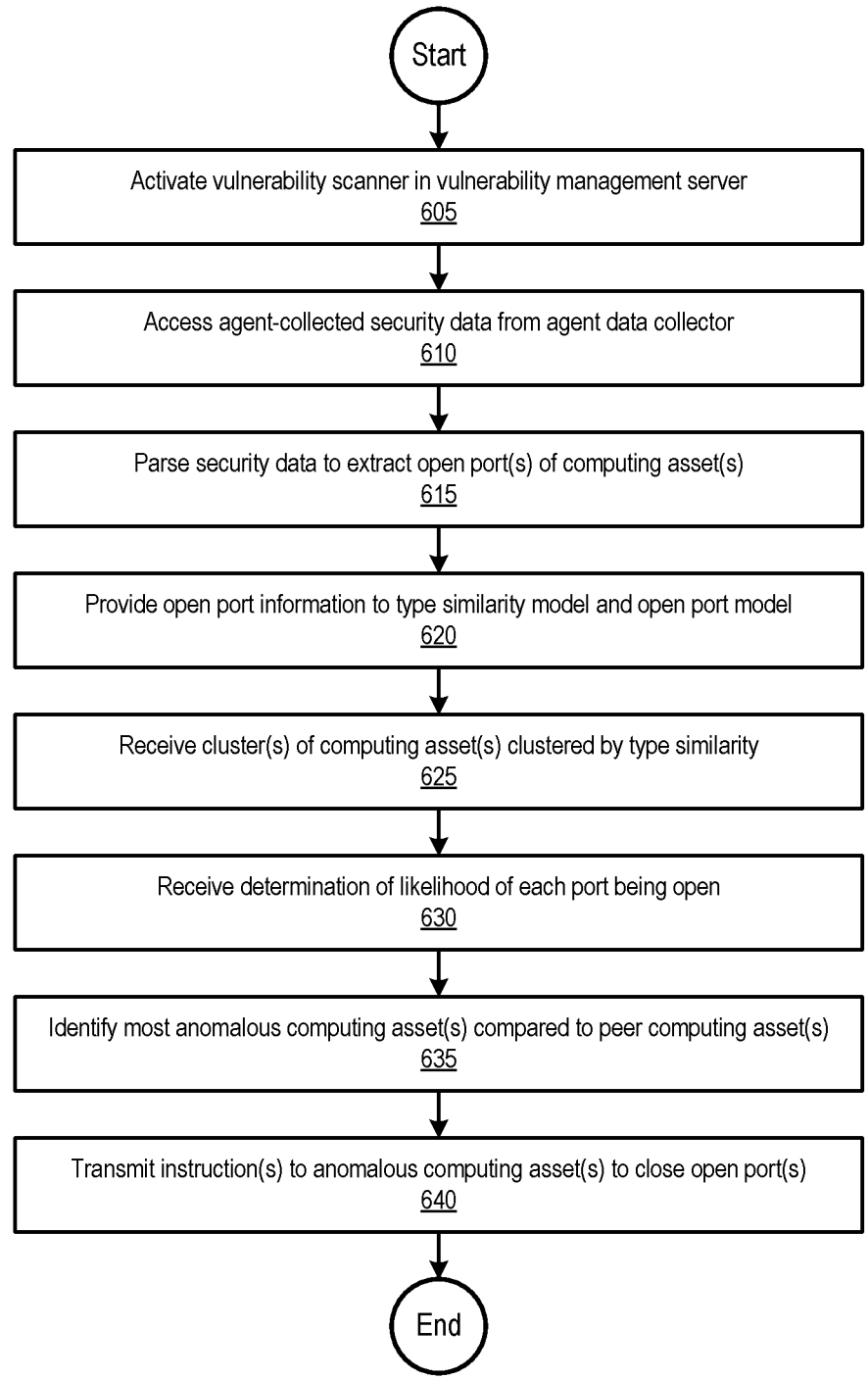
FIG. 6 is a flowchart 600 of a process for closing open ports on anomalous assets, according to one embodiment of the present disclosure.

FIG. 6 is a flowchart 600 of a process for closing open ports on anomalous assets, according to one embodiment. The process begins at 605 by activating vulnerability scanner 130 in vulnerability management server 105. At 610, the process accesses agent-collected security data from an agent data collector (e.g., security data 205(1) collected from DCA 145(1) by agent data collector 115 as shown in FIG. 2). At 615, the process parses the security data to extract open port(s) of computing asset(s) (e.g., open port information 210(1) from security data 205(1) as shown in FIG. 2).

At 620, the process provides open port information to type similarity model 230 and open port model 235 (e.g., global open port data 220 as shown in FIG. 2 or live open port data 310 as shown in FIG. 3). At 625, the process receives cluster(s) of computing assets clustered by type similarity (e.g., based on the similarity of installed software, and the like). In this example, k-means clustering is used to generate similar asset cluster 320 based on installed software. At 630, the process receives a determination of the likelihood of each port being open (e.g., using one or more statistical methods and based on historical open port data).

At 635, the process identifies the "most" anomalous computing asset(s) compared to one or more peer computing asset(s) and ends at 640 by transmitting instruction(s) to (the identified) anomalous computing asset(s) to close (their respective) open port(s). Such instructions can be transmitted to one or more of computing assets 135(1)-(N) with anomalous open ports by anomalous asset detection system 110 or by vulnerability scanner 130 (e.g., as part of a vulnerability scanning or management process).

Example Dual-Phase Anomaly Detection Based on Open Ports

Figure 7:
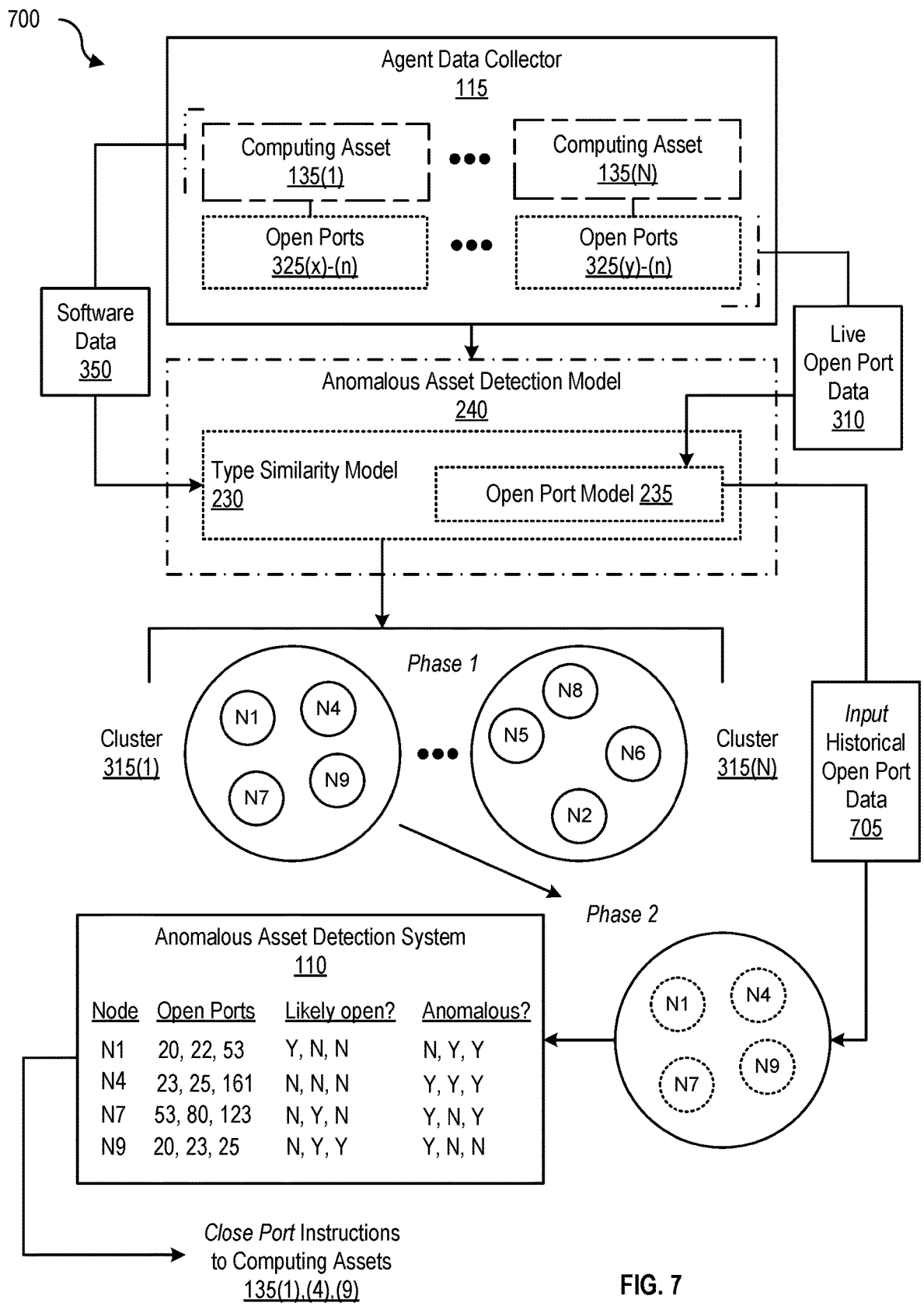
FIG. 7 is a block diagram 700 of a vulnerability management system that detects anomalous assets based on open ports, according to one embodiment of the present disclosure.

FIG. 7 is a block diagram 700 of a vulnerability management system that detects anomalous assets based on open ports, according to one embodiment. Agent data collector 115 receives security data 205(1)-(N) associated with computing assets 135(1)-(N) from an agent executing on the computing assets (e.g., agents 140(1)-(N)). Agent data collector 115 extracts open port information associated with the computing assets from the security data to identify one or more open ports on one or more computing assets (e.g., open ports 325(x)-(n) associated with computing asset 135(1) and open ports 325(y)-(n) associated with computing asset 135(N) as shown in FIG. 7).

The open port information (e.g., live open port data 310 (or global open port data 220)) and a list of computing assets with open ports (e.g., software data 350 (or list of computing assets 225 (with open ports and software information))) is provided to anomalous asset detection model 240. As shown in FIG. 7, anomalous asset detection model 240 implements type similarity model 230, which further implements open port model 235. In certain embodiments, anomalous asset detection based on open ports is performed in at least two phases.

In Phase 1, type similarity model 230 generates clusters of computing assets based on a type similarity characteristic indicated by software data 350 (e.g., installed software on the computing assets). For example, cluster 315(1) includes nodes 1, 4, 7, and 9 and cluster 315(N) includes nodes 2, 5, 6, and 8 (e.g., after k-means clustering is performed). In Phase 2, open port model 235 receives an input of historical open port data 705 and processes historical open port data 705 using statistical models—but limited by computing assets only present in cluster 315(1)—to determine whether each port associated with nodes 1, 4, 7, and 9 is likely to be open (or should be open). In doing so, anomalous asset detection system 110 detects anomalous computing assets and generates (and transmits) close port instructions to computing assets 135(1), 135(4), and 135(9) (e.g., as shown in FIG. 7).

Therefore, it will be appreciated that the methods, systems, and processes disclosed herein can be used to optimize vulnerability management computing systems to perform anomaly detection based on open ports while foreclosing unilateral reliance on cumbersome pre-defined checks and inaccurate rule-based solutions.

Example Computing Environment

Figure 8:
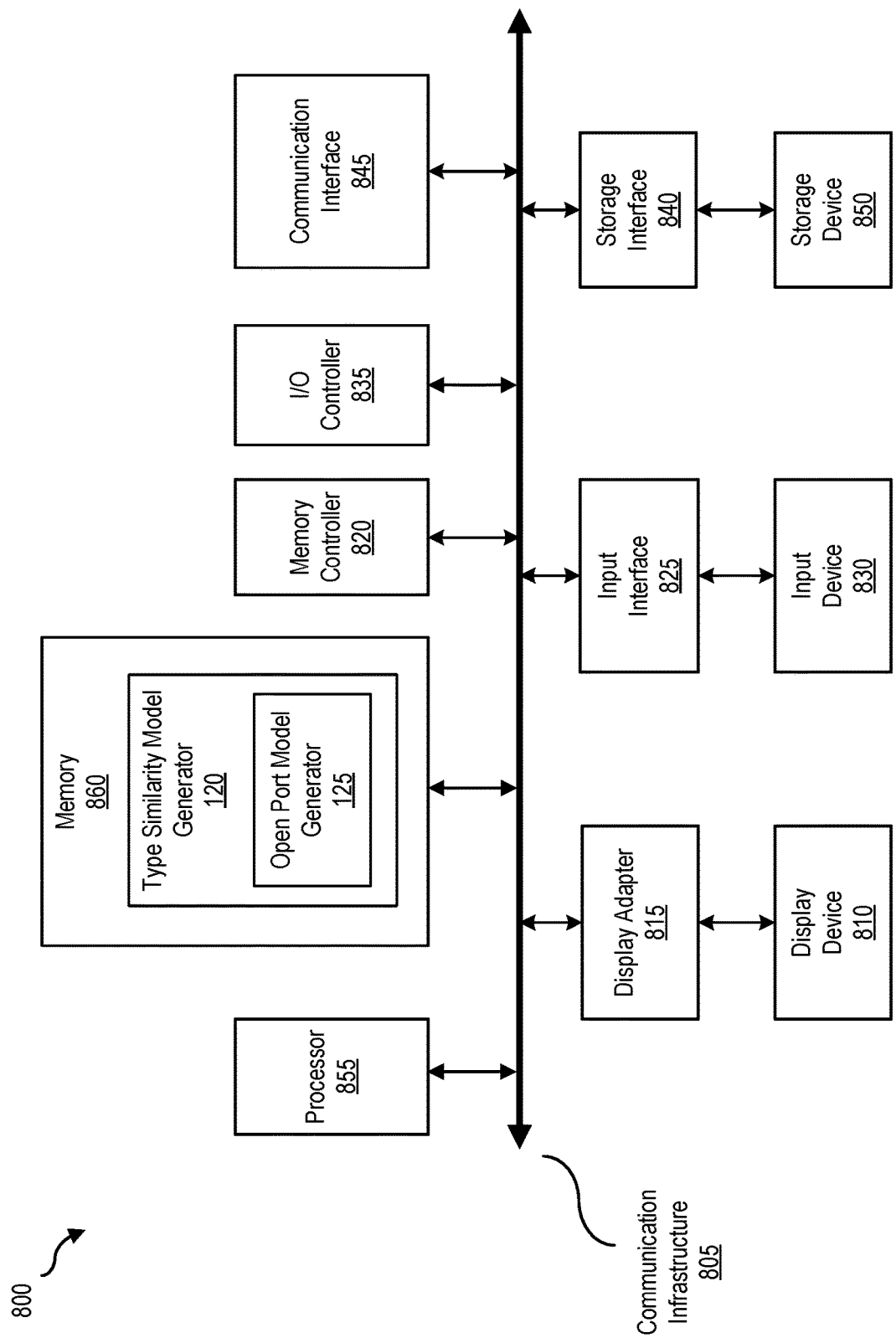
FIG. 8 is a block diagram 800 of a computing system, illustrating a type similarity model generator and an open port model generator implemented in software, according to one embodiment of the present disclosure.

FIG. 8 is a block diagram 800 of a computing system, illustrating how an anomalous asset detection system can be implemented in software, according to one embodiment. Computing system 800 can include vulnerability management server 105 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices, network appliances, storage controllers, and the like. In its most basic configuration, computing system 800 may include at least one processor 855 and a memory 860. By executing the software that executes anomalous asset detection system 110, computing system 800 becomes a special purpose computing device that is configured to detect anomalous computing assets based on open ports.

Processor 855 generally represents any type or form of processing unit capable of processing data or interpreting and executing instructions. In certain embodiments, processor 855 may receive instructions from a software application or module that may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein.

Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 800 may include both a volatile memory unit and a non-volatile storage device. In one example, program instructions implementing anomalous asset detection system 110 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805, and may perform and/or be a means for performing, either alone or in combination with other elements, one or more of the operations or features described and/or illustrated herein. I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type/form of communication device/adapter capable of facilitating communication between computing system 800 and other devices and may facilitate communication between computing system 800 and a private or public network. Examples of communication interface 845 include, a wired network interface (e.g., network interface card), a wireless network interface (e.g., a wireless network interface card), a modem, and any other suitable interface. Communication interface 845 may provide a direct connection to a remote server via a direct link to a network, such as the Internet, and may also indirectly provide such a connection through, for example, a local area network. Communication interface 845 may also represent a host adapter configured to facilitate communication between computing system 800 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 800 may also include at least one display device 810 coupled to communication infrastructure 805 via a display adapter 815 that generally represents any type or form of device capable of visually displaying information forwarded by display adapter 815. Display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850. When executed by processor 855, a computer program loaded into computing system 800 may cause processor 855 to perform and/or be a means for performing the functions of one or more of the embodiments described/illustrated herein. Alternatively, one or more of the embodiments described and/or illustrated herein may be implemented in firmware and/or hardware.

Example Networking Environment

Figure 9:
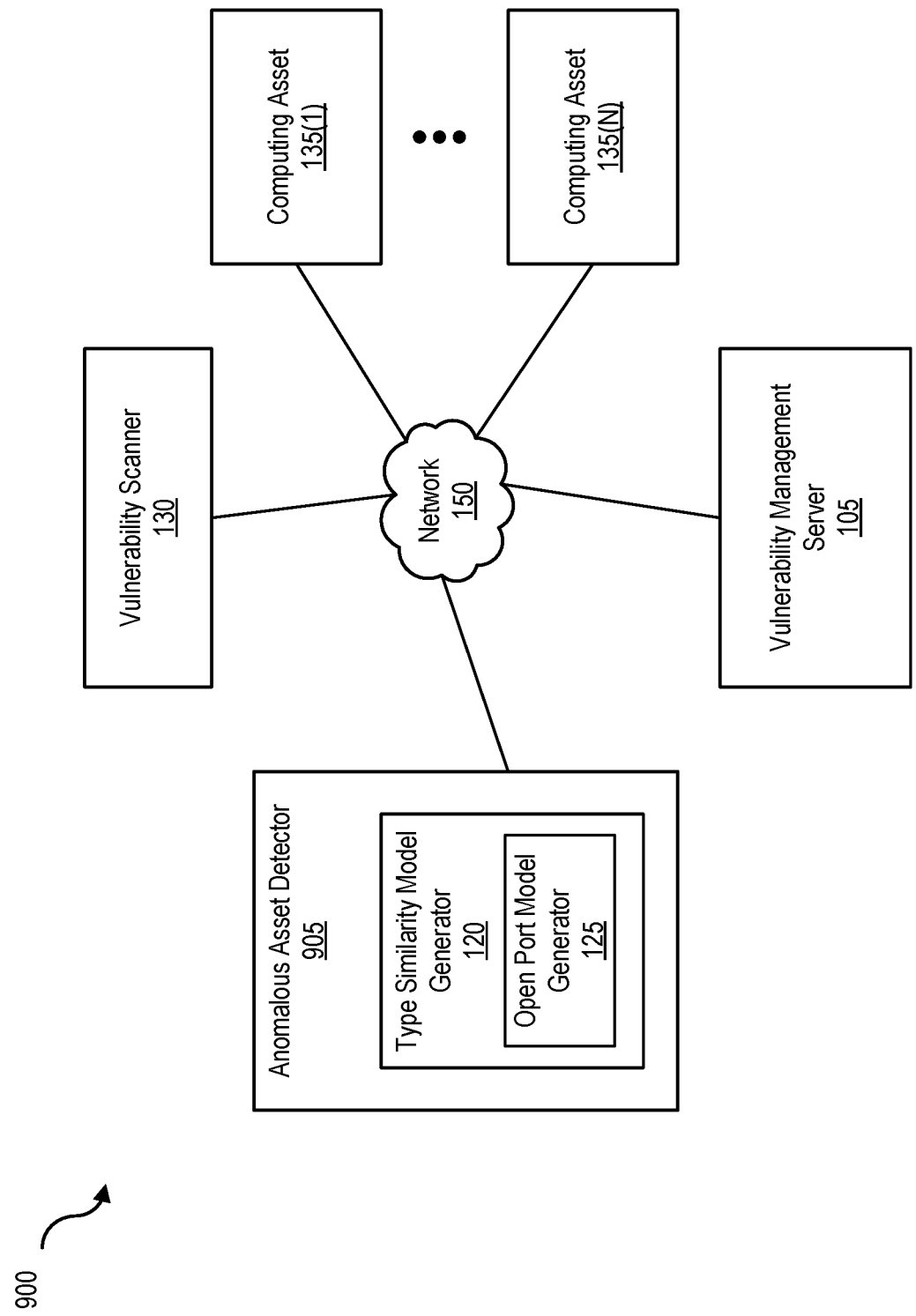
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. Network 150 generally represents any type or form of computer network or architecture capable of facilitating communication between vulnerability management server 105, computing assets 135(1)-(N), and/or anomalous asset detector 905. For example, network 150 can be a Wide Area Network (WAN) (e.g., the Internet) or a Local Area Network (LAN). In certain embodiments, a communication interface, such as communication interface 845 in FIG. 8, may be used to provide connectivity between vulnerability management server 105, computing assets 135(1)-(N), and/or anomalous asset detector 905, and network 150.

Type similarity model generator 120 and open port model generator 125 may be part of vulnerability management server 105, or may be separate. If separate, anomalous asset detection system 905 and vulnerability management server 105 may be communicatively coupled via network 150. All or a portion of embodiments may be encoded as a computer program and loaded onto and executed by anomalous asset detection system 905 and/or vulnerability management server 105, and may be stored on anomalous asset detection system 905 and/or vulnerability management server 105, and distributed over network 150.

In some examples, all or a portion of anomalous asset detection system 905 and/or vulnerability management server 105 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. The embodiments described and/or illustrated herein are not limited to the Internet or any particular network-based environment.

Various functions described herein may be provided through a remote desktop environment or any other cloud-based computing environment. In addition, one or more of the components described herein may transform data, physical devices, and/or representations of physical devices from one form to another. For example, type similarity model generator 120 and open port model generator 125 may transform the behavior of anomalous asset detection system 905 and/or vulnerability management server 105 to detect anomalous computing assets based on open ports in cybersecurity computing environments.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:
    receiving security data associated with a plurality of computing assets in a computing environment;
    extracting, from the security data, open port information associated with one or more computing assets of the plurality of computing assets;
    generating, based on the open port information, (1) a type similarity model and (2) an open port model;
    determining, based on the type similarity model, a particular computing asset in the computing environment that is similar to the one or more computing assets;
    determining, based on the open port model, likelihoods of different ports being open on the particular computing asset;
    determining that the particular computing asset is anomalous based on one or more open ports on the particular computing asset and the likelihoods; and
    generating an alert indicating that the particular computing asset is anomalous.

2. The computer-implemented method of claim 1, wherein
    the security data is collected by respective data collection agents executing on the computing assets in the computing environment, and
    the security data is received by a vulnerability scanner implemented in a network remote from the computing environment.

3. The computer-implemented method of claim 2, further comprising:
    in response to the vulnerability scanner determining that the particular computing asset is anomalous, sending instructions to an agent executing on the particular computing asset to close one or more of the open ports.

4. The computer-implemented method of claim 1, further comprising:
    detecting multiple computing assets that are anomalous based on their open ports;
    identifying a subset of the multiple computing assets that are most anomalous; and
    sending instructions to respective agents on the subset of computing assets to close open ports on the subset of computing assets.

5. The computer-implemented method of claim 1, wherein
    the type similarity model is a clustering model that clusters computing assets based on asset characteristics including one or more of: a role type, a use case type, a job type, a team type, a group type, and a department type.

6. The computer-implemented method of claim 1, wherein
    the type similarity model is generated based on installed software of the one or more computing assets.

7. The computer-implemented method of claim 1, wherein
    the open port model is generated based on a historical frequency of different ports being open on the one or more computing assets.

8. The computer-implemented method of claim 1, wherein
    the determination that the particular computing asset is anomalous is made by an anomalous asset detection model based on output of the type similarity model and the open port model.

9. The computer-implemented method of claim 1, wherein
    the alert is generated at vulnerability management server at a Security Operations Center (SOC).

10. The computer-implemented method of claim 1, further comprising:
    in response to the alert, causing one or more firewall policies of the computing environment to be modified.

11. A system comprising:
one or more processors; and
a memory coupled to the one or more processors, wherein the memory stores program instructions executable by the one or more processors to:
receive security data associated with a plurality of computing assets in a computing environment;
extract, from the security data, open port information associated with one or more computing assets of the plurality of computing assets;
generate, based on the open port information, (1) a type similarity model and (2) an open port model;
determine, based on the type similarity model, a particular computing asset in the computing environment that is similar to the one or more computing assets;
determine, based on the open port model, likelihoods of different ports being open on the particular computing asset;
determine that the particular computing asset is anomalous based on one or more open ports on the particular computing asset and the likelihoods; and
generate an alert indicating that the particular computing asset is anomalous.

12. The system of claim 11, wherein
the security data is collected by respective data collection agents executing on the computing assets in the computing environment, and
the system implements a vulnerability scanner in a network remote from the computing environment.

13. The system of claim 11, wherein the program instructions are executable by the one or more processors to:
in response to the determination that the particular computing asset is anomalous, send instructions to an agent executing on the particular computing asset to close one or more of the open ports.

14. The system of claim 11, wherein the program instructions are executable by the one or more processors to:
detect multiple computing assets that are anomalous based on their open ports;
identify a subset of the multiple computing assets that are most anomalous; and
send instructions to respective agents on the subset of computing assets to close open ports on the subset of computing assets.

15. The system of claim 11, wherein
the type similarity model is a clustering model that clusters computing assets based on asset characteristics including one or more of: a role type, a use case type, a job type, a team type, a group type, and a department type.

16. The system of claim 11, wherein
the type similarity model is generated based on installed software of the one or more computing assets.

17. The system of claim 11, wherein
the open port model is generated based on a historical frequency of different ports being open on the one or more computing assets.

18. The system of claim 11, wherein
the determination that the particular computing asset is anomalous is made by an anomalous asset detection model based on output of the type similarity model and the open port model.

19. The system of claim 11, wherein
the alert is generated at vulnerability management server at a Security Operations Center (SOC).

20. A non-transitory computer readable storage medium storing program instructions executable to:
receive security data associated with a plurality of computing assets in a computing environment;
extract, from the security data, open port information associated with one or more computing assets of the plurality of computing assets;
generate, based on the open port information, (1) a type similarity model and (2) an open port model;
determine, based on the type similarity model, a particular computing asset in the computing environment that is similar to the one or more computing assets;
determine, based on the open port model, likelihoods of different ports being open on the particular computing asset;
determine that the particular computing asset is anomalous based on one or more open ports on the particular computing asset and the likelihoods; and
generate an alert indicating that the particular computing asset is anomalous.

* * * * *